(12) United States Patent
Kim (10) Patent No.: US 9,004,210 B2
(45) Date of Patent: Apr. 14, 2015

(54) AGRICULTURAL WORK VEHICLE

(75) Inventor: Soon Yeol Kim, Changnyeong-gun (KR)

(73) Assignee: Daedong Industrial Co., Ltd., Daegu (KR)

( * ) Notice: Subject to any disclaimer, the term of this patent is extended or adjusted under 35 U.S.C. 154(b) by 13 days.

(21) Appl. No.: 14/001,135

(22) PCT Filed: Feb. 21, 2012

(86) PCT No.: PCT/KR2012/001294
§ 371 (c)(1),
(2), (4) Date: Aug. 22, 2013

(87) PCT Pub. No.: WO2012/115423
PCT Pub. Date: Aug. 30, 2012

(65) Prior Publication Data
US 2013/0327582 A1 Dec. 12, 2013

(30) Foreign Application Priority Data

Feb. 22, 2011 (KR) .................. 10-2011-0015466
Feb. 22, 2011 (KR) .................. 10-2011-0015469

(51) Int. Cl.
*B60K 13/02* (2006.01)
*B60K 11/04* (2006.01)
*B60R 16/02* (2006.01)
*B60R 16/04* (2006.01)
*B60K 26/00* (2006.01)

(52) U.S. Cl.
CPC ................ *B60K 11/04* (2013.01); *B60R 16/02* (2013.01); *B60R 16/04* (2013.01); *B60K 13/02* (2013.01); *B60K 26/00* (2013.01)

(58) Field of Classification Search
CPC ........ B60R 16/02; B60R 16/04; B60K 11/04; B60K 13/02; B60K 26/00
USPC ....................................... 180/68.3
See application file for complete search history.

(56) References Cited

FOREIGN PATENT DOCUMENTS

| JP | 07-061293 A | 3/1995 |
|---|---|---|
| JP | 2006-342704 A | 12/2006 |
| JP | 2010-215165 A | 9/2010 |

OTHER PUBLICATIONS

International Search Report for PCT/KR2012/001294.

*Primary Examiner* — Hau Phan
*Assistant Examiner* — Jacob Meyer
(74) *Attorney, Agent, or Firm* — LRK Patent Law Firm (57) ABSTRACT

An agricultural work vehicle is disclosed. The main components of the agricultural work vehicle according to one embodiment of the present invention are: a radiator mounted on the vehicle chassis in front of the engine in the engine compartment; an air cleaner support disposed in front of the radiator; the vehicle chassis, the length of which extends forward of the air cleaner support structure; a battery stored in the space created by the vehicle chassis extension forward of the air cleaner support structure; and an engine control unit securely disposed by a fixing bracket secured to a side of the air cleaner support, in the space above the battery in the engine compartment.

11 Claims, 10 Drawing Sheets

AGRICULTURAL WORK VEHICLE

TECHNICAL FIELD

The present invention relates to an agricultural work vehicle, and more particularly, to an agricultural work vehicle having a structure that changes the layout of an engine compartment of the agricultural work vehicle less and effectively secure an engine control unit (ECU).

BACKGROUND ART

An agricultural work vehicle is the same as general vehicles in structure, but is mainly used for cultivation because it is equipped with a strong power engine and has a good traction power and is strong. In order to use the agricultural work vehicle for cultivation, it may be selectively equipped with a farm working machinery (for instance, a rotary device), which have a structure suitable for covering up seed with soil or leveling ground work as occasion demands.

A rotary power for actuating the farm working machinery mounted on the agricultural work vehicle is generated from a main engine of the agricultural work vehicle. The conventional agricultural work vehicle generally and widely adopts a method that the movement of the engine is mechanically controlled by a cable displacement and an adjustment of the degree of opening of a throttle valve due to a manipulation of a foot acceleration pedal or a hand acceleration pedal (or a hand acceleration lever).

However, such a conventional agricultural work vehicle adopting the mechanically engine-controlling method has a problem in that it is deteriorated in the general vehicle performances (fuel efficiency, effect, exhaust gas control, and so on) because it is difficult to precisely control the engine core functions, such as ignition time, fuel injection time, idle rotation, and so on. In order to overcome the above-mentioned problem, recently, an attempt to apply an engine control unit (ECU), which has been applied to general vehicles, also to the agricultural work vehicle has been spread.

In order to apply the engine control unit to the conventional agricultural work vehicle, an additional space for arranging the engine control unit inside a limited engine compartment space must be secured. For this, because the entire lay out of the engine compartment must be changed or the engine compartment space must be enlarged, the entire appearance of the work vehicle is changed or the size of the engine compartment space is increased.

DISCLOSURE

Technical Problem

Accordingly, the present invention has been made in an effort to solve the above-mentioned problems occurring in the prior arts, and it is an object of the present invention to provide an agricultural work vehicle having a structure that changes the layout of an engine compartment of the agricultural work vehicle less and effectively secure an engine control unit (ECU).

Technical Solution

To achieve the above objects, the present invention provides an agricultural work vehicle including: a radiator mounted on the vehicle chassis frame in front of the engine in the engine compartment; an air cleaner support disposed in front of the radiator; the vehicle chassis, the length of which extends forward in front of the air cleaner support; a battery stored in the space created by the vehicle chassis frame extending forward in front of the air cleaner support; and an engine control unit securely disposed above the battery inside an engine compartment space by means of a fixing bracket secured to a side of the air cleaner support.

In an aspect of the present invention, the agricultural work vehicle further includes: a mesh mounted on the air cleaner support; and an air cleaner arranged in the engine compartment space spaced upwardly from the battery by means of the air cleaner support, the air cleaner being supported on the air cleaner support in such a manner that the air cleaner is inclined downwardly at a predetermined angle toward the front of the vehicle body.

In this instance, the fixing bracket is securely mounted at a vertical member of a side of the air cleaner support, and the rear face of the plane of the engine control unit is arranged to form an angle with the plane of the mesh by the fixing bracket.

Differently from the above, the fixing bracket is securely mounted at a vertical member of a side of the air cleaner support, and the rear face of the plane of the engine control unit is faced with the plane of the mesh by the fixing bracket in parallel.

In another aspect of the present invention, the agricultural work vehicle further includes: a mesh mounted on the air cleaner support; and an air cleaner arranged in a space between the battery and the air cleaner support by means of the air cleaner support.

In this instance, the fixing bracket is securely fixed at a horizontal member of the air cleaner support above the air cleaner, and the engine control unit is mounted above the air cleaner in front of the air cleaner support by means of the fixing bracket.

The engine control unit is mounted in such a way that the rear face of the plane of the engine control unit is inclined downwardly against the plane of the mesh, or the rear face of the plane of the engine control unit is faced with the plane of the mesh in parallel.

Differently from the above, the fixing bracket is securely mounted at a vertical member of the air cleaner support of a side of the air cleaner, and the engine control unit is mounted at the side of the air cleaner by means of the fixing bracket. In this instance, the engine control unit is mounted in such a way that the rear face of the plane of the engine control unit is inclined toward the center of the front end of the vehicle chassis frame.

In the present invention, the agricultural work vehicle further includes a plate mounted on the vehicle chassis frame extending in front of the air cleaner support, the battery being mounted in a receiving space formed in the vehicle chassis frame by perforating the center of the plate.

Advantageous Effects

The agricultural work vehicle according to the present invention includes the engine control unit arranged inside the engine compartment utilizing a spare space for mounting the battery inside the engine compartment, such that the engine control unit (ECU) can be mounted in the limited engine compartment space without changing the lay-out of the engine compartment of the conventional agricultural work vehicle.

Moreover, because the engine control unit is mounted in the engine compartment in front of the radiator, the agricultural work vehicle according to the present invention can effectively prevent overheat of the engine control unit from the outside cold air introduced from the front of the engine compartment hood, and allows the engine control unit to be mounted at the optimum position that is never affected by radiant heat of the radiator.

MODE FOR INVENTION

Reference will be now made in detail to the preferred embodiments of the present invention with reference to the attached drawings. In the present invention, description of the same configuration and action as the prior arts will be omitted, and when it is judged that detailed descriptions of known functions or structures related with the present invention may make the essential points vague, the detailed descriptions of the known functions or structures will be omitted. In description of the preferred embodiments of the present invention, the same components have the same reference numerals in the drawings.

Figure 1:
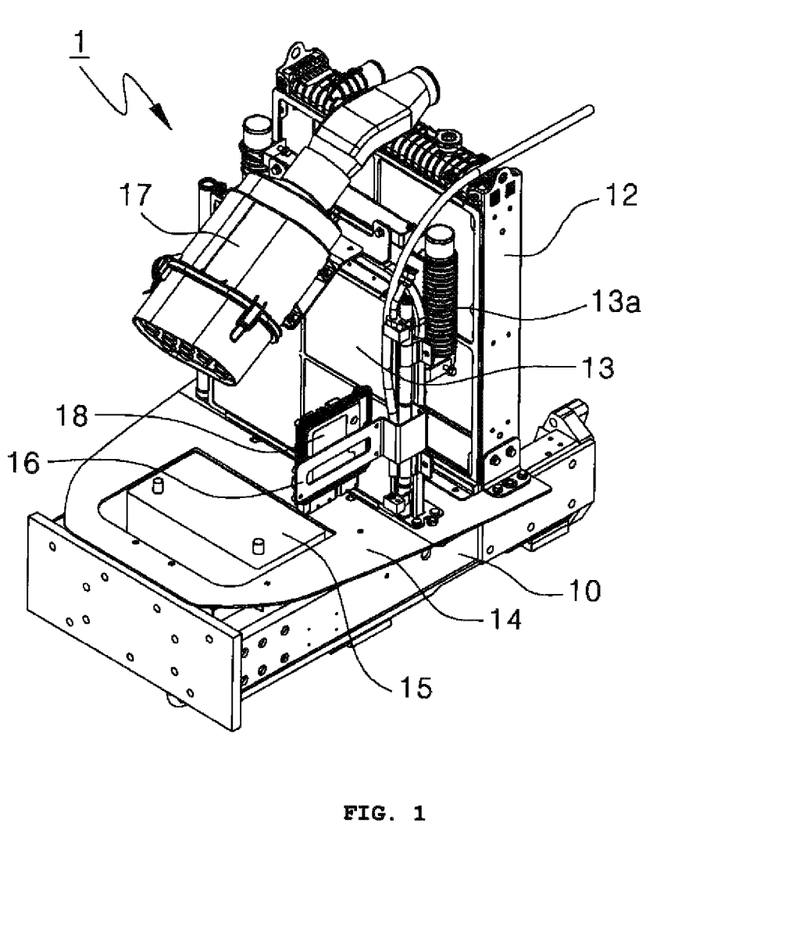
FIG. 1 is a perspective view of the front side of an engine compartment of an agricultural work vehicle according to a first preferred embodiment of the present invention.
Figure 2:
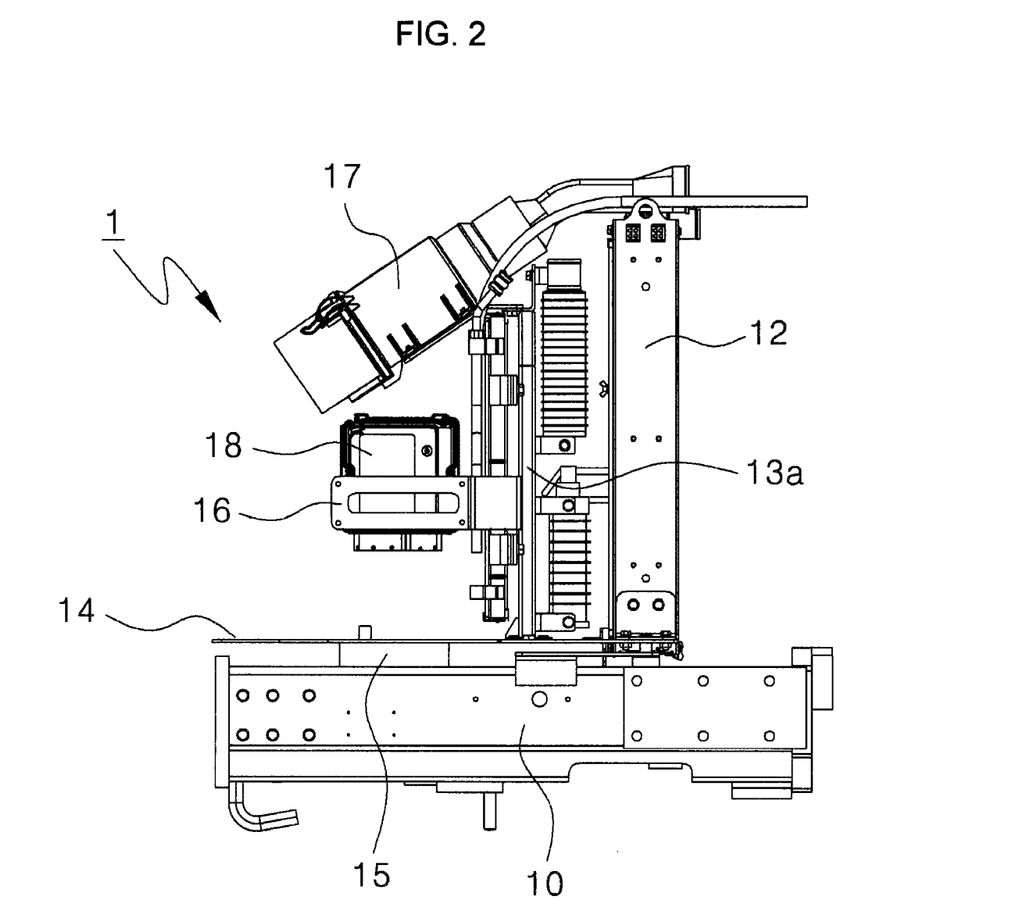
FIG. 2 is a side view of the engine compartment of FIG. 1.

FIG. 1 is a perspective view of the front side of an engine compartment of an agricultural work vehicle according to a first preferred embodiment of the present invention, and FIG. 2 is a side view of the engine compartment of FIG. 1, namely, FIGS. 1 and 2 illustrate an arrangement structure of the engine compartment which may be applied to large-sized models.

Referring to FIGS. 1 and 2, an engine compartment 1 in the agricultural work vehicle, for instance, a tractor, is generally formed in the front of a vehicle body. The engine compartment 1 is divided into a vehicle chassis frame 10 and an engine compartment hood (its reference numeral is omitted). Such an engine compartment 1 is equipped with an engine (not shown) and main compartments related with operation of the vehicle body for instance, an oil fan (not shown), a battery 15, a radiator 12, and others.

The radiator 12 is arranged on the vehicle chassis frame 10 in front of the engine inside the engine compartment 1. Moreover, the vehicle chassis frame 10 extends more in front of the radiator 12. Therefore, as shown in the drawings, the vehicle chassis frame 10 in front of the radiator 12 secures a space for mounting main components, such as an air cleaner support 13a and a battery 15, on the vehicle chassis frame 10.

A plate 14 may be mounted on the vehicle chassis frame 10 extending in front of the radiator 12. The plate 14 functions to block introduction of foreign matters, such as dust, from the lower part of the vehicle body toward the engine compartment 1 while the vehicle runs. Additionally, the plate 14 provides a mounting surface for allowing the main components, for instance, the radiator 12 and the air cleaner support 13a, to be mounted in stability.

The battery 15 is transversely arranged on the vehicle chassis frame 10 extending in front of the air cleaner support in the width direction of the vehicle body. In detail, the battery 15 can be firmly mounted inside a receiving space (there is no reference numeral), which is formed in the vehicle chassis frame 10 by perforating the center of the plate 14 on the vehicle chassis frame 10, by a holder or a bracket (not shown) without generating any movement during running of the vehicle body.

An engine control unit (ECU) 18 for precisely controlling the core functions of the engine, for instance, ignition time, fuel injection time, and idle rotation, is arranged above the battery 15 inside an engine compartment space. In detail, the engine control unit 18 is spaced apart from the plate 14, which forms an engine compartment floor by means of a fixing bracket 16 which forms a fixed end on the air cleaner support 13a.

As shown in FIGS. 1 and 2 illustrating the first preferred embodiment of the present invention, the engine control unit 18 may be mounted in such a manner that the rear face of the plane of the engine control unit 18 is arranged to form an angle with the plane of a mesh 13 mounted on the air cleaner support 13a by means of the fixing bracket 16 mounted at a vertical member of a side (left side) of the air cleaner support 13a, for instance, arranged in such a manner that the plane of the mesh 13 is at right angles to the rear face of the plane of the engine control unit 18.

The fixing bracket 16 may be changed in shape and structure according to the shape or the structure of the engine control unit 18. Therefore, the fixing bracket 16 is not limited to the shape and the structure illustrated in the drawings. In other words, if the engine control unit 18 located in the space in front of the air cleaner support 13a can be stably supported without any interference from other components, any fixing bracket can be applied without any special limitation.

The reference numeral 17 designates an air cleaner for filtering foreign matters when the outside air is introduced into the engine for fuel-air mixture.

In the first preferred embodiment, as shown in the drawings, the air cleaner 17 is stably secured in the inside space of the engine compartment 1 upwardly separated from the battery 15 by the air cleaner support 13a. In this instance, the air cleaner 17 is inclined downwardly at a predetermined angle toward the front of the vehicle body in order to effectively utilize wind generated when the vehicle runs and in consideration of the entire lay-out limited by an engine compartment hood.

The mesh 13 is mounted on the air cleaner support 13a in order to prevent foreign matters introduced from the outside during running of the vehicle from being directly introduced into the radiator 12. Furthermore, a condenser (its reference numeral is omitted) for condensing refrigerant may be mounted between the mesh 13 and the radiator 12 just in case of a cabin agricultural work vehicle with advanced features having an air conditioner.

Figure 3:
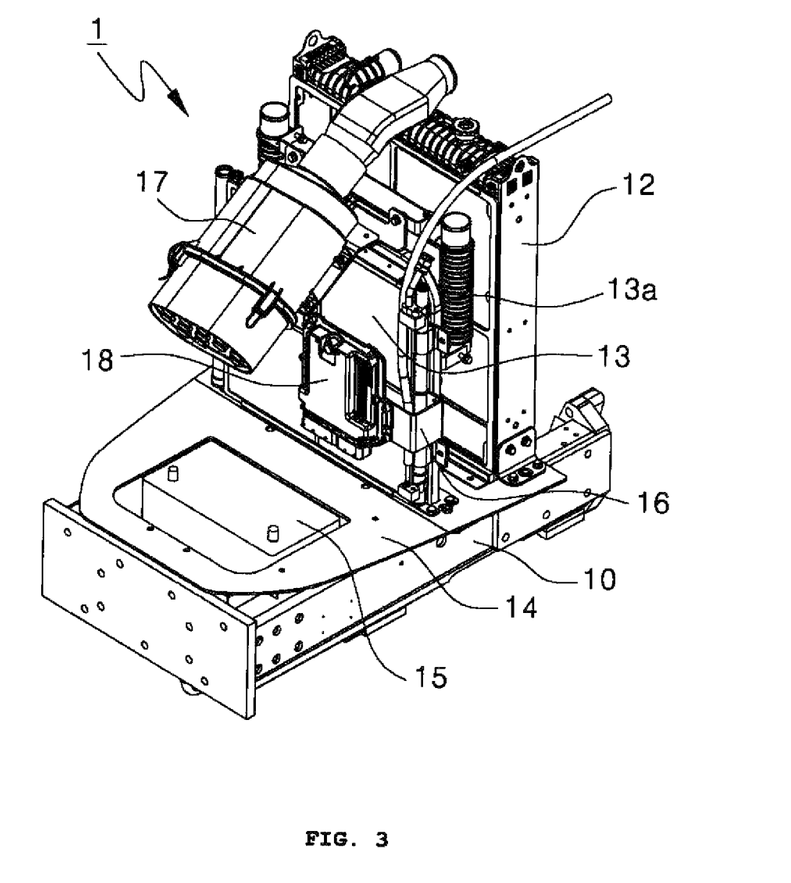
FIG. 3 is a view showing a modification of the agricultural work vehicle according to the first preferred embodiment.
Figure 4:
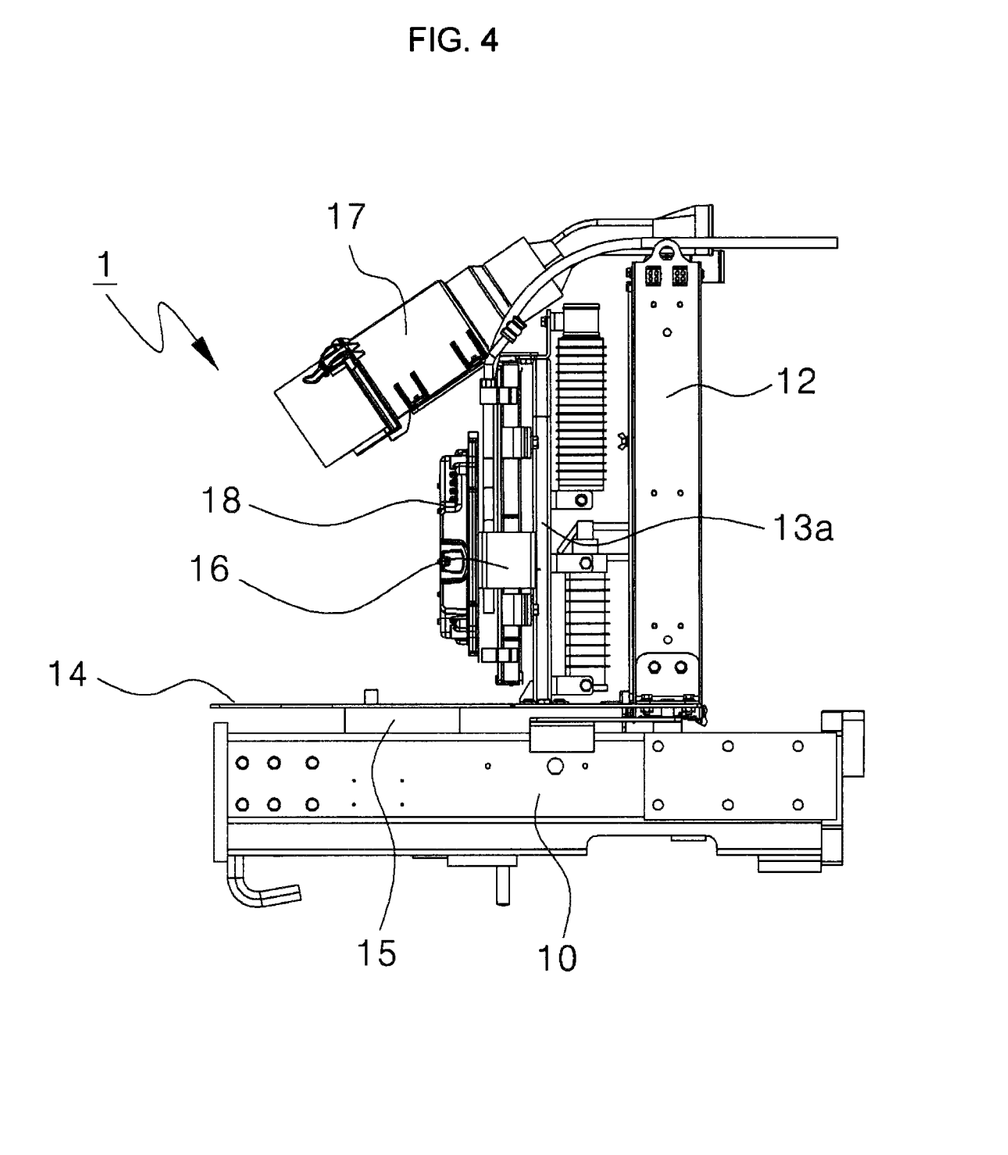
FIG. 4 is a side view of an engine compartment according to the modification of FIG. 3.

FIG. 3 is a view showing a modification of the agricultural work vehicle according to the first preferred embodiment, and FIG. 4 is a side view of an engine compartment according to the modification of FIG. 3.

In the modification illustrated in FIGS. 3 and 4, like the first preferred embodiment, the engine control unit 18 is mounted above the battery inside the engine compartment space by means of the fixing bracket 16 fixed at one side of the air cleaner support 13a. In this instance, except in the case that there is a little difference in detailed arrangement of the engine control unit 18, there is little difference in structure between the first preferred embodiment and the modification.

Referring to FIGS. 3 and 4, the engine control unit 18 is located above the battery inside the engine compartment space by means of the fixing bracket 16 fixed at one side of the air cleaner support 13a. Like the first preferred embodiment, the battery 15 is transversely arranged on the vehicle chassis frame 10 extending in front of the air cleaner support in the width direction of the vehicle body, and the radiator 12 is arranged on the plate 14 in the rear of the battery 15. In addition, the air cleaner support 13a is mounted between the radiator 12 and the battery 15.

The engine control unit 18 is located in the space in front of the mesh 13 mounted on the air cleaner support 13a by means of the fixing bracket 16 having the fixed end on the vertical member at one side of the air cleaner support 13a. In detail, the engine control unit 18 in this embodiment is mounted in such a way that the rear face of the plane of the engine control unit 18 is faced with the plane of the mesh 13 in parallel.

Figure 5:
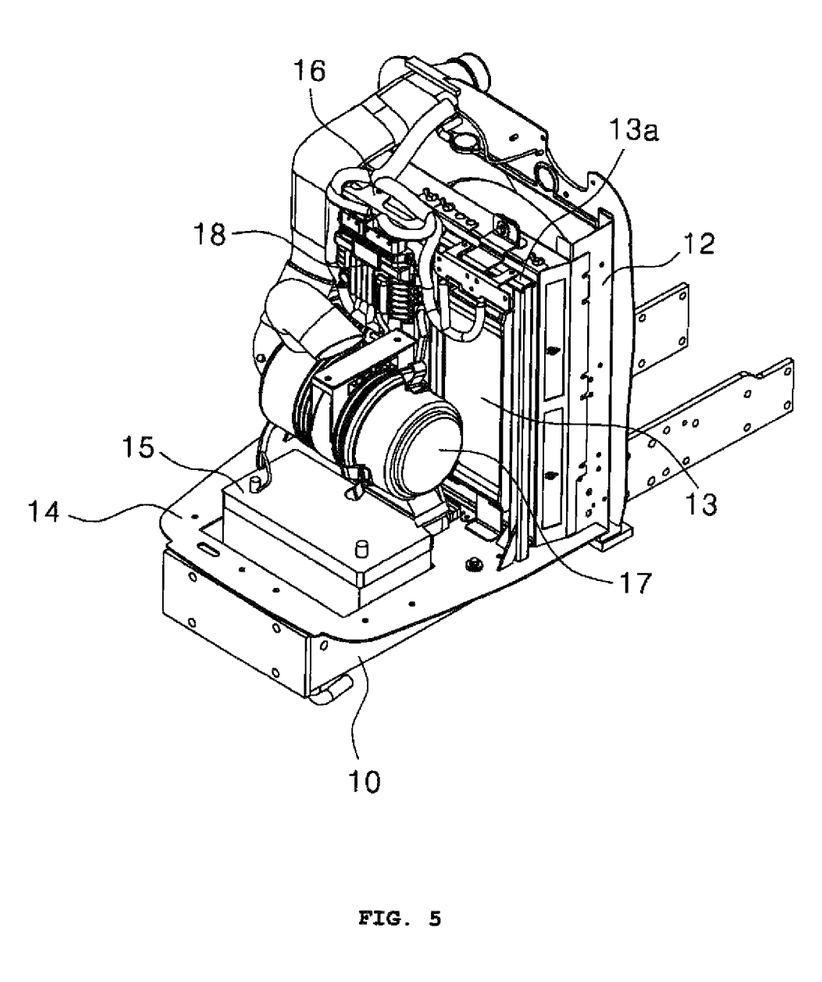
FIG. 5 is a perspective view of the front side of an engine compartment of an agricultural work vehicle according to a second preferred embodiment of the present invention.
Figure 6:
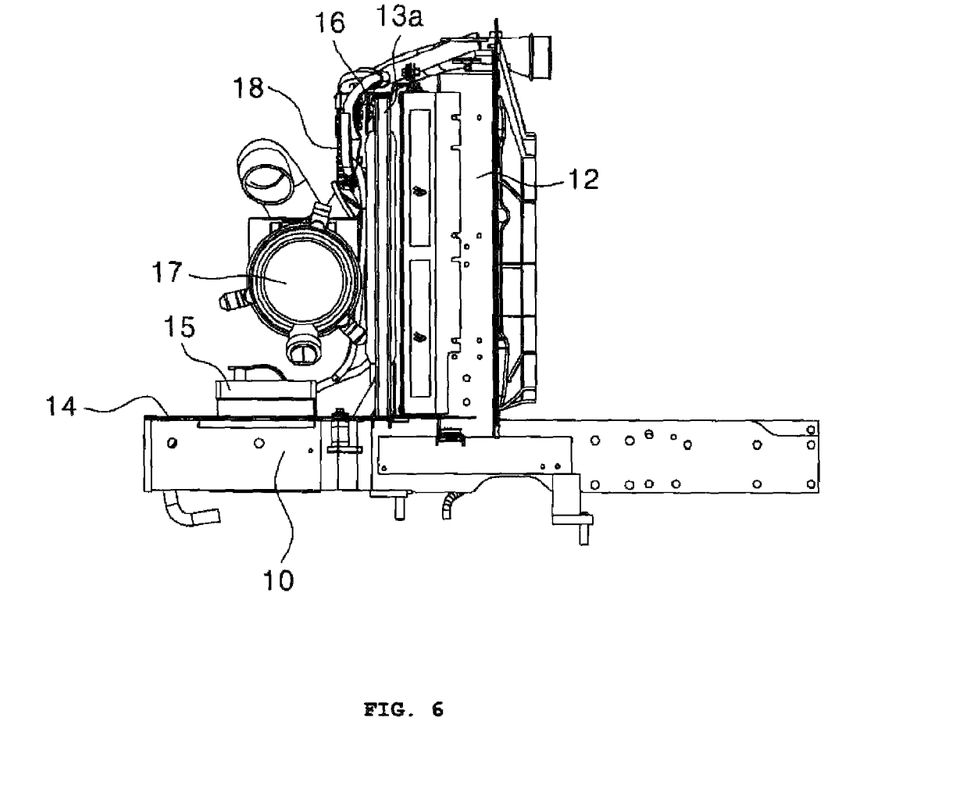
FIG. 6 is a side view of the engine compartment of FIG. 5.

FIGS. 5 and 6 are a perspective view and a side view of the front side of an engine compartment of an agricultural work vehicle according to a second preferred embodiment of the present invention. Differently from the first preferred embodiment, the drawings illustrate an engine compartment structure applicable to middle-sized models. The same components as the first preferred embodiments have the same reference numerals as the first preferred embodiments.

Differently from the first preferred embodiment, in the second preferred embodiment illustrated in FIGS. 5 and 6, the air cleaner 17 is arranged adjacent to the plate 14 between the battery 15, which is mounted in a battery receiving space (its reference numeral is omitted) formed in the vehicle chassis frame 10, and the air cleaner support 13a. In this instance, as shown in the drawings, like the battery 15, the air cleaner 17 is transversely arranged in the width direction of the vehicle body, and the engine control unit 18 is arranged above the air cleaner 17.

The engine control unit 18 can be stably mounted above the air cleaner 17 by means of the fixing bracket 16 having the fixed end at the air cleaner support 13a. Preferably, as shown in the drawings, the engine control unit 18 is mounted at the central portion of the upper part of the front of the air cleaner support 13a by fixing an end portion of the fixing bracket 16 at an approximately central portion of a horizontal member (its reference numeral is omitted) mounted at the top of the air cleaner support.

Figure 7:
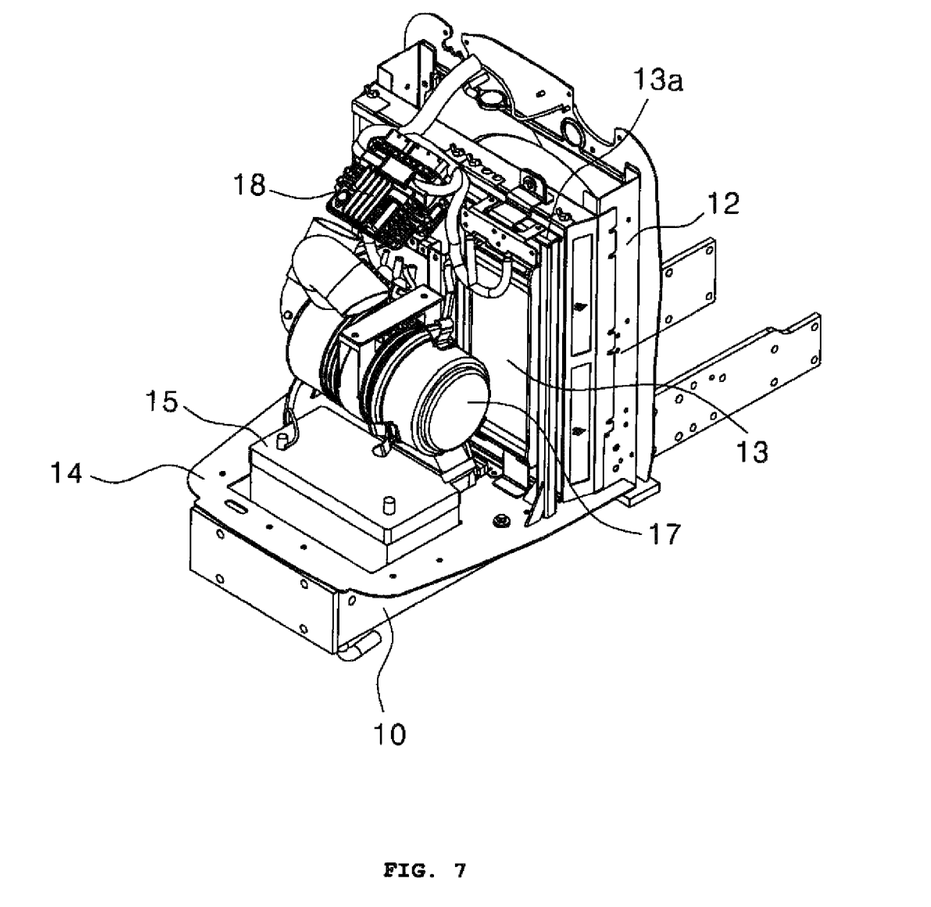
FIG. 7 is a view showing a modification of the agricultural work vehicle according to the second preferred embodiment.
Figure 8:
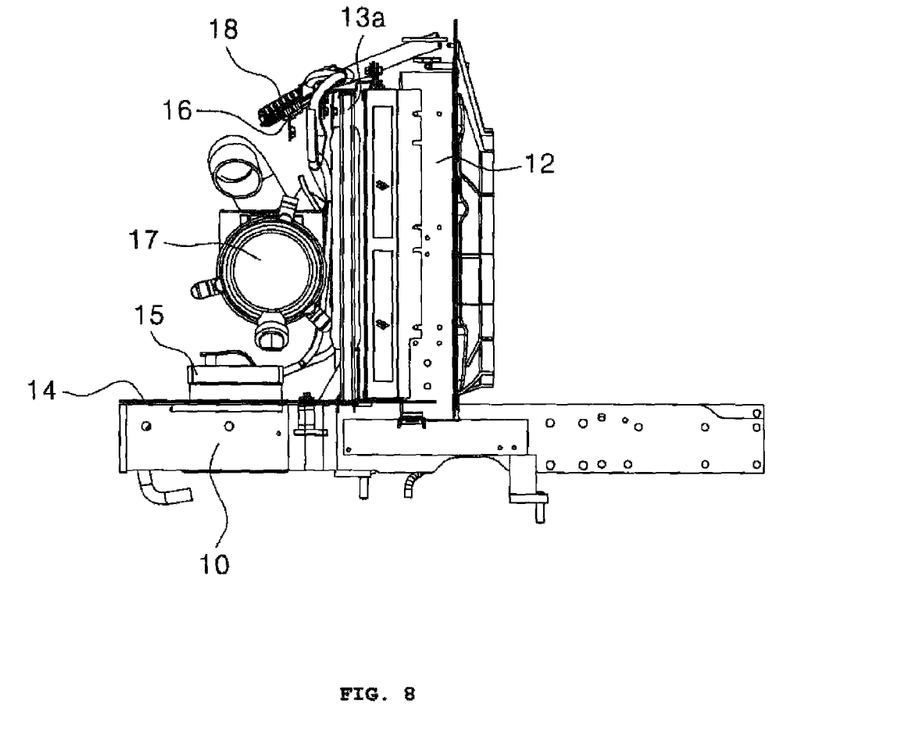
FIG. 8 is a side view of an engine compartment according to the modification of FIG. 7.

When the engine control unit 18 is secured above the air cleaner 17 inside the engine compartment space in the above-mentioned structure, the engine control unit 18 is arranged in such a way that the rear face of the plane of the engine control unit 18 is inclined downwardly against the plane of the mesh 13 mounted on the air cleaner support, or as shown in FIGS. 7 and 8, arranged in such a way that the rear face of the plane of the engine control unit 18 is faced with the plane of the mesh 13 in parallel.

Figure 9:
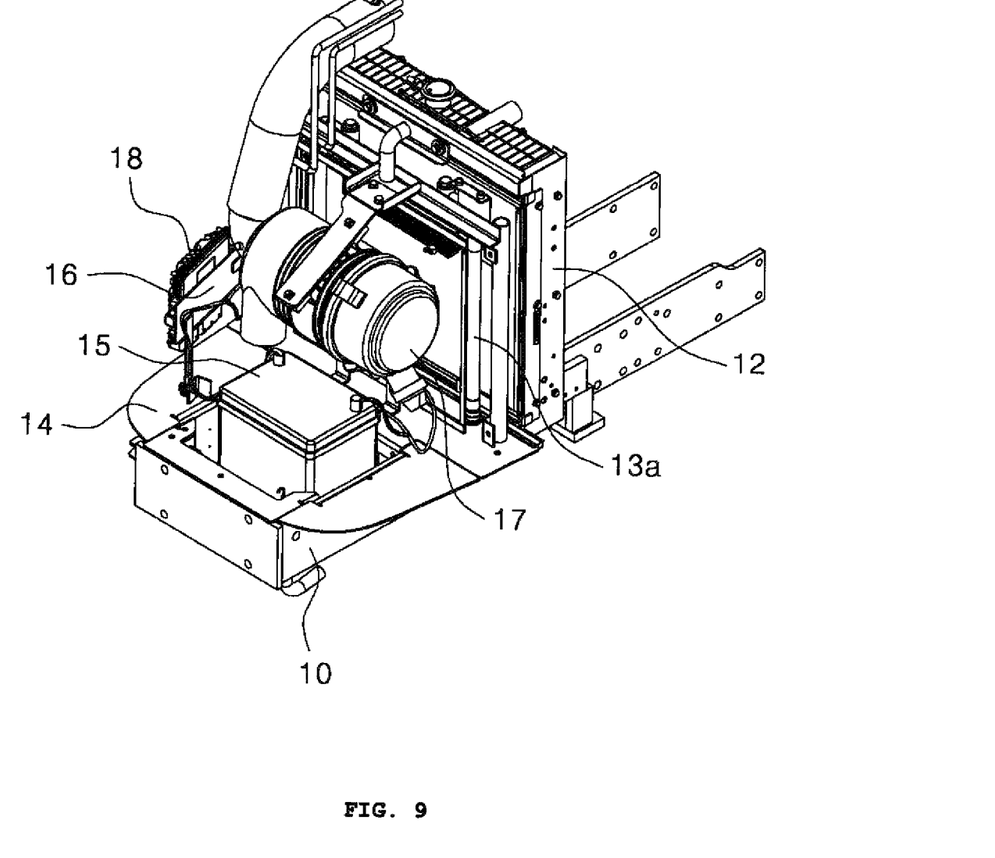
FIG. 9 is a view showing another modification of the agricultural work vehicle according to the second preferred embodiment.
Figure 10:
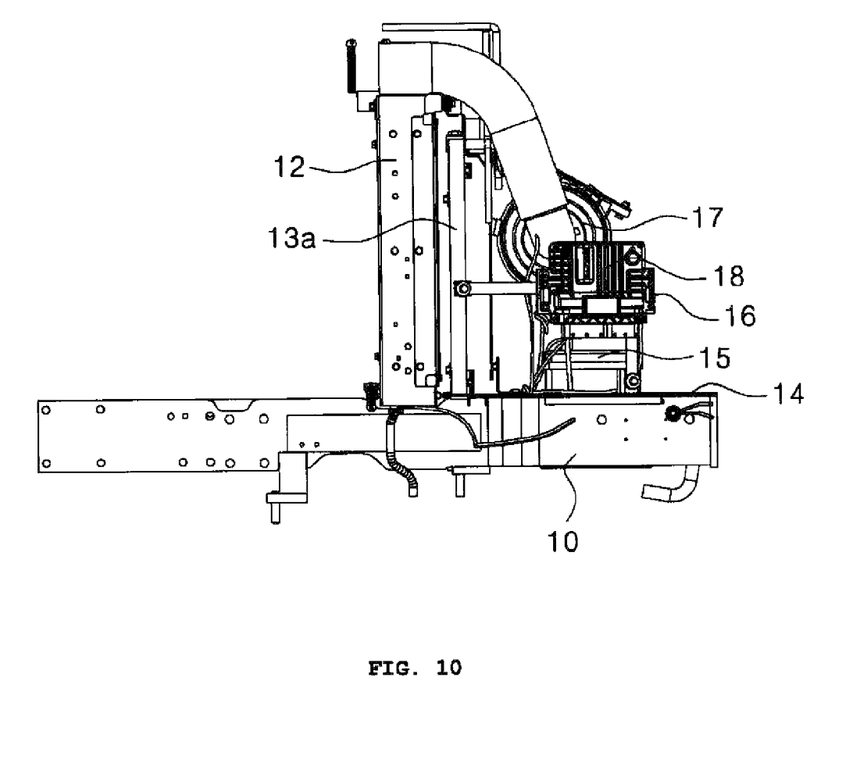
FIG. 10 is a side view of the engine compartment of FIG. 9

FIGS. 9 and 10 illustrate another modification of the second preferred embodiment in which the engine control unit is arranged adjacent to the side of the air cleaner.

In the second modification of the second preferred embodiment illustrated in FIGS. 9 and 10, the engine control unit 18 is arranged in the engine compartment space spaced apart from the side of the air cleaner 17 at a predetermined interval and is adjacent to the air cleaner 17. For this arrangement, the fixing bracket 16 for securing the engine control unit 18 may be fixed and secured on the vertical member (its reference numeral is omitted) of the air cleaner support 13a.

In order to arrange the engine control unit 18 to the side of air cleaner 17, in consideration of the entire lay-out limited by the engine compartment hood, as shown in the drawings, it is preferable that the engine control unit 18 is arranged in such a way that the rear face of the plane of the engine control unit 18 is inclined upwardly toward the center of the front end of the vehicle chassis frame.

In the drawings, when it is viewed from the front, the engine control unit 18 is arranged at the left side of the air cleaner 17, but on the contrary, it is obvious to those skilled in the art that the engine control unit 18 may be arranged at the right side of the air cleaner 17.

As described above, the agricultural work vehicle according to the preferred embodiments of the present invention includes the engine control unit arranged inside the engine compartment utilizing a spare space for mounting the battery inside the engine compartment, such that the engine control unit (ECU) can be mounted in the limited engine compartment space without changing the lay-out of the engine compartment of the conventional agricultural work vehicle.

In other words, because the engine control unit can be additionally arranged in the limited engine compartment space without changing the arrangement form of the main components, the agricultural work vehicle according to the present invention can reduce expenses for additionally mounting the engine control unit, secure easiness in mounting the engine control unit, and utilize the limited engine compartment space more effectively.

Moreover, because the engine control unit is mounted in the engine compartment in front of the radiator, the agricultural work vehicle according to the present invention can effectively prevent overheat of the engine control unit from the outside cold air introduced from the front of the engine compartment hood, and allows the engine control unit to be mounted at the optimum position that is never effected by radiant heat of the radiator.

While the particular embodiments of the present invention have been particularly described in this specification of the present invention and shown with reference to the attached drawings, it should be understood that there is no intent to limit the example embodiments of the present invention to the particular forms disclosed, but on the contrary, example embodiments of the invention are to cover all modifications, equivalents, and alternatives falling within the spirit and scope of the invention defined by the claims.

EXPLANATION OF ESSENTIAL REFERENCE NUMERALS IN DRAWINGS

1: engine compartment
10: vehicle chassis frame
12: radiator
13: mesh
13a: air cleaner support
14: plate
15: battery
16: fixing bracket
17: air cleaner
18: engine control unit (ECU)

The invention claimed is:
1. An agricultural work vehicle comprising:
a radiator mounted on a vehicle chassis frame in front of an engine in an engine compartment;
an air cleaner support disposed in front of the radiator;

the vehicle chassis frame, a length of which extends forward in front of the air cleaner support;

a battery stored in a space created by the vehicle chassis frame extending forward in front of the air cleaner support; and an engine control unit securely disposed above the battery inside an engine compartment space by means of a fixing bracket secured to a side of the air cleaner support.

2. The agricultural work vehicle according to claim 1, further comprising:

a mesh mounted on the air cleaner support; and an air cleaner arranged in the engine compartment space spaced upwardly from the battery by means of the air cleaner support, the air cleaner being supported on the air cleaner support in such a manner that the air cleaner is inclined downwardly at a predetermined angle toward a front of the vehicle body.

3. The agricultural work vehicle according to claim 2, wherein the fixing bracket is securely mounted at a vertical member of a side of the air cleaner support, and a rear face of a plane of the engine control unit is arranged to form an angle with a plane of the mesh by the fixing bracket.

4. The agricultural work vehicle according to claim 2, wherein the fixing bracket is securely mounted at a vertical member of a side of the air cleaner support, and a rear face of a plane of the engine control unit is faced with a plane of the mesh by the fixing bracket in parallel.

5. The agricultural work vehicle according to claim 1, further comprising:

a mesh mounted on the air cleaner support; and an air cleaner arranged in a space between the battery and the air cleaner support by means of the air cleaner support.

6. The agricultural work vehicle according to claim 5, wherein the fixing bracket is securely fixed at a horizontal member of the air cleaner support above the air cleaner, and the engine control unit is mounted above the air cleaner in front of the air cleaner support by means of the fixing bracket.

7. The agricultural work vehicle according to claim 6, wherein the engine control unit is mounted in such a way that a rear face of a plane of the engine control unit is inclined downwardly against a plane of the mesh.

8. The agricultural work vehicle according to claim 6, wherein the engine control unit is mounted in such a way that a rear face of a plane of the engine control unit is faced with a plane of the mesh in parallel.

9. The agricultural work vehicle according to claim 5, wherein the fixing bracket is securely mounted at a vertical member of the air cleaner support of a side of the air cleaner, and the engine control unit is mounted at the side of the air cleaner by means of the fixing bracket.

10. The agricultural work vehicle according to claim 9, wherein the engine control unit is mounted in such a way that a rear face of a plane of the engine control unit is inclined toward a center of a front end of the vehicle chassis frame.

11. The agricultural work vehicle according to claim 1, further comprising:

a plate mounted on the vehicle chassis frame extending in front of the air cleaner support, the battery being mounted in a receiving space formed in the vehicle chassis frame by perforating a center of the plate.

* * * * *